United States Patent
Wang et al.

(10) Patent No.: US 10,575,159 B2
(45) Date of Patent: Feb. 25, 2020

(54) COMMISSIONING OF A WIRELESS-COMMUNICATION ENABLED DEVICE

(71) Applicant: SIGNIFY HOLDING B.V., Eindhoven (NL)

(72) Inventors: Gang Wang, Eindhoven (NL); Dunfa Chen, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 15/767,443

(22) PCT Filed: Sep. 28, 2016

(86) PCT No.: PCT/EP2016/073109
§ 371 (c)(1),
(2) Date: Apr. 11, 2018

(87) PCT Pub. No.: WO2017/063884
PCT Pub. Date: Apr. 20, 2017

(65) Prior Publication Data
US 2018/0302775 A1    Oct. 18, 2018

(30) Foreign Application Priority Data

Oct. 12, 2015  (WO) ................. PCT/CN2015/000690
Oct. 29, 2015  (EP) ..................................... 15192018

(51) Int. Cl.
*H04W 4/80* (2018.01)
*H04W 84/18* (2009.01)
(Continued)

(52) U.S. Cl.
CPC ............. *H04W 4/80* (2018.02); *H04W 48/10* (2013.01); *H04W 48/16* (2013.01); *H04W 60/00* (2013.01);
(Continued)

(58) Field of Classification Search
CPC combination set(s) only.
See application file for complete search history.

(56) References Cited

U.S. PATENT DOCUMENTS 9,986,411 B1 * 5/2018 Stamatakis ........... H04W 8/005
2009/0059919 A1 * 3/2009 Kim ...................... H04W 48/12
370/389
(Continued)

FOREIGN PATENT DOCUMENTS

WO     2014202639 A1    12/2014
WO     2015078778 A1     6/2015

OTHER PUBLICATIONS

Oyvind Strom, Sr. Director of Wireless Solutions, Atmel Corporation, "Implementing ZigBee Light Link for Lighting Control".
(Continued)

*Primary Examiner* — Cindy Trandai
(74) *Attorney, Agent, or Firm* — Daniel J. Piotrowski

(57) ABSTRACT

A standardized protocol defines that, when an initiator node is not already joined to a wireless network, and initiates a linking operation between the initiator node a second node, then this will create a new wireless network. According to the disclosure, a field of one of the standardized messages is adapted, and the adapted message is sent from the initiator node to the second node, in order to indicate that the adapted message is in fact a request for the initiator node to join an existing wireless network, to which the second node is already joined. The field in question is a field which the standardized protocol allows to be varied for application specific purposes. In response to the adapted message, the initiator receives back an invitation message inviting the initiator node to join the existing network; and in response to the invitation message, the initiator joins the existing network.

14 Claims, 4 Drawing Sheets

(51) Int. Cl.
    *H04W 48/10*     (2009.01)
    *H04W 48/16*     (2009.01)
    *H04W 60/00*     (2009.01)
    *H05B 37/02*     (2006.01)

(52) U.S. Cl.
    CPC ........ *H04W 84/18* (2013.01); *H05B 37/0272* (2013.01)

(56) References Cited

U.S. PATENT DOCUMENTS

| | | | | |
|---|---|---|---|---|
| 2010/0150063 A1* | 6/2010 | Lee | H04W 99/00 | 370/328 |
| 2011/0082905 A1* | 4/2011 | Wentink | H04W 84/20 | 709/205 |
| 2011/0149803 A1* | 6/2011 | McCormack | H04W 8/005 | 370/254 |
| 2011/0184582 A1* | 7/2011 | Jang | H04L 12/12 | 700/296 |
| 2011/0314163 A1* | 12/2011 | Borins | H04W 4/08 | 709/227 |
| 2012/0124373 A1* | 5/2012 | Dangoor | H04L 63/062 | 713/168 |
| 2012/0299509 A1* | 11/2012 | Lee | H04L 41/0806 | 315/291 |
| 2013/0149966 A1* | 6/2013 | Lee | H04W 12/08 | 455/41.2 |
| 2013/0227152 A1* | 8/2013 | Lee | H04W 48/16 | 709/227 |
| 2014/0362762 A1* | 12/2014 | Eom | H04B 7/15592 | 370/315 |
| 2015/0043484 A1* | 2/2015 | Jung | H04W 76/14 | 370/329 |
| 2015/0223046 A1* | 8/2015 | Patil | H04W 8/005 | 370/254 |
| 2015/0245450 A1* | 8/2015 | Sung | H05B 37/0272 | 315/292 |
| 2016/0029457 A1* | 1/2016 | Sung | H04W 48/10 | 315/294 |
| 2016/0037615 A1* | 2/2016 | Davis | H05B 37/0272 | 315/291 |
| 2016/0073474 A1* | 3/2016 | Van De Sluis | H05B 37/029 | 315/312 |
| 2016/0112518 A1* | 4/2016 | Haleem | H04W 4/70 | 713/168 |
| 2016/0142263 A1* | 5/2016 | Erdmann | H04W 8/005 | 455/41.2 |
| 2016/0248629 A1* | 8/2016 | Erdmann | H04W 24/02 | |
| 2016/0291595 A1* | 10/2016 | Halloran | A47L 5/30 | |
| 2016/0295669 A1* | 10/2016 | Thijssen | H05B 37/0254 | |
| 2016/0337327 A1* | 11/2016 | Borean | H04W 84/18 | |
| 2017/0005860 A1* | 1/2017 | Tan | H04W 84/20 | |
| 2017/0094706 A1* | 3/2017 | Kim | H04W 4/70 | |
| 2017/0134182 A1* | 5/2017 | Davis | H04W 4/70 | |
| 2017/0311360 A1* | 10/2017 | Singh | H04W 4/80 | |
| 2018/0248760 A1* | 8/2018 | Deixler | H04L 67/125 | |

OTHER PUBLICATIONS

Zigbee Alliance: "ZigBee Light Link Standard", Zigbee Document 11-0037-10, Zigbee Alliance, US, No. Version 1.0 Apr. 5, 2012 (Apr. 5, 2012), pp. 1-107, XP002720584, Retrieved from the Internet: URL:https://www.zigbee.org/Standards/ZigBeeLightLink/download.aspx.

* cited by examiner

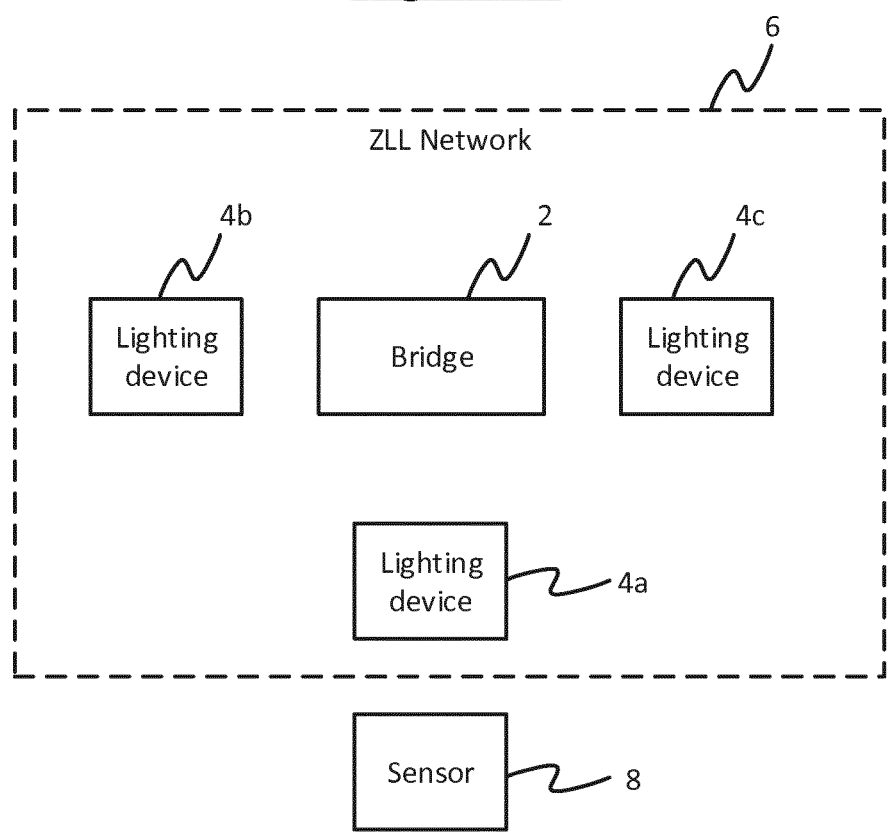

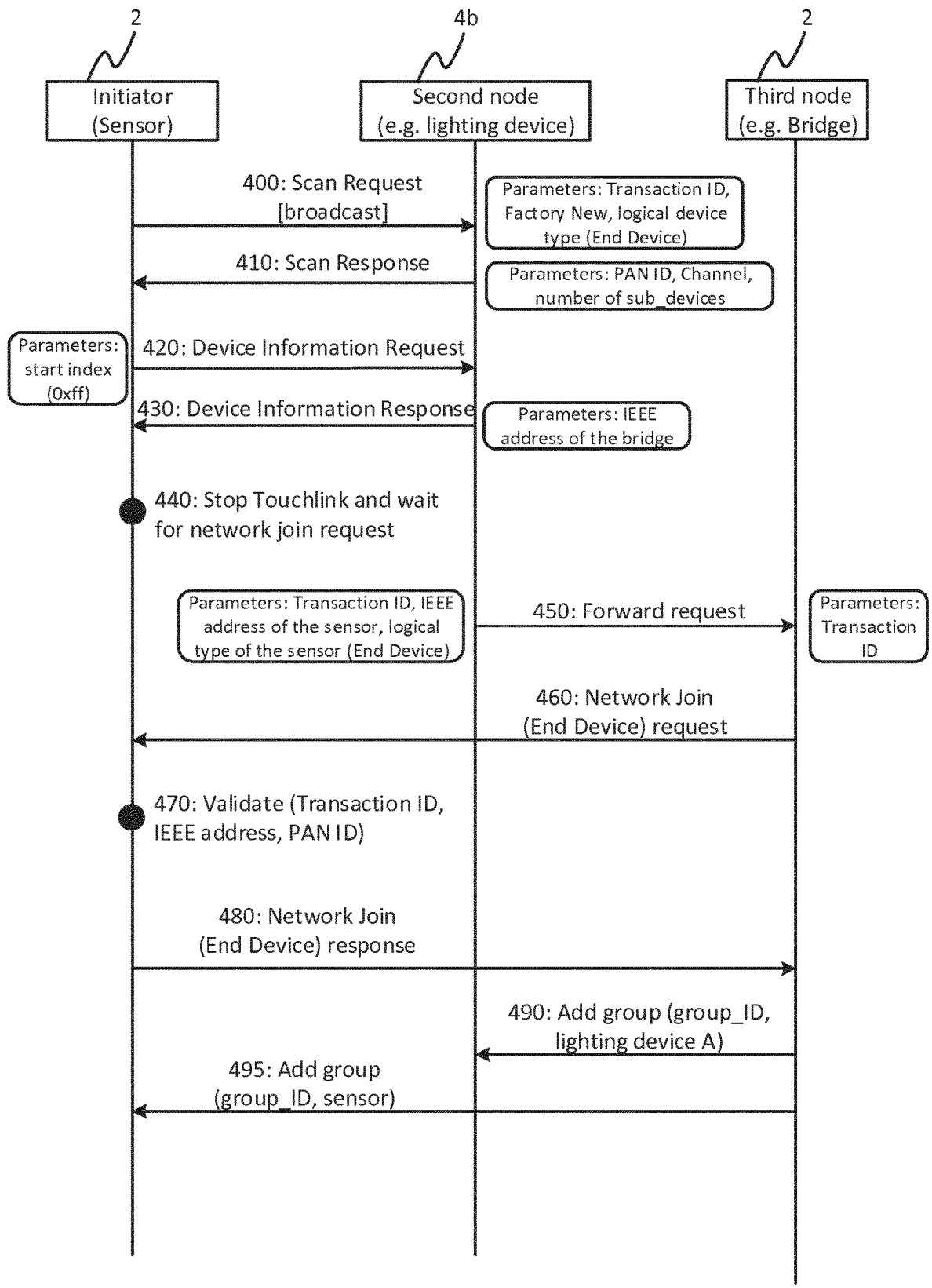

COMMISSIONING OF A WIRELESS-COMMUNICATION ENABLED DEVICE

CROSS-REFERENCE TO PRIOR APPLICATIONS

This application is the U.S. National Phase application under 35 U.S.C. § 371 of International Application No. PCT/EP2016/073109, filed on Sep. 28, 2016 which claims the benefit of Chinese Patent Application No. PCT/CN2015/000690, filed on Oct. 12, 2015 and European Patent Application No. 15192018.8, filed on Oct. 29, 2015. These applications are hereby incorporated by reference herein.

TECHNICAL FIELD

The present disclosure relates to the commissioning of a wireless-communication enabled device to join a wireless network, such as to commission a sensor device to be paired with a luminaire in a ZigBee network.

BACKGROUND

ZigBee Light Link (ZLL) is an open standard designed for wireless control of LED lighting. LED fixtures, sensors, timers, remotes and switches built using ZLL can connect into a wireless home network without requiring a special device to coordinate. For example, the Philips Hue is a ZLL based lighting system containing a bridge controller and a number of lighting devices (e.g. LED "bulbs"), each being a node of the network. The bridge provides an interface between the network and a user device such as a smartphone, tablet or laptop, via another wireless technology such as Wi-Fi, in order to enable the user to wirelessly control the lighting from an application ("app") running on the user device.

To make sure that consumers can easily install and add extra devices to their home lighting network, ZLL developed a commissioning mechanism which is simple for consumers and does not have a need for a coordinator. This mechanism is known as Touchlink.

Touchlink is used for the basic commissioning of a new ZLL network or adding a new node to an existing ZLL network. Taking the Philips Hue system as an example, to connect the bridge controller and multiple light bulbs into a ZLL network, a user needs to conduct two types of Touchlink operations.

FIG. 1 illustrates the process of creating a ZLL network. ZigBee is a protocol for forming mesh networks. In a mesh network, some nodes of the network can have a dual role of both relaying messages to other nodes in the network, and also being a consumer and/or source of messages sent within the network; whereas some other nodes of the mesh network may only be sources and/or consumers of messages. ZigBee refers to the former as Routers and the latter as End Devices. ZigBee also defines a state known as Factory New (FN), which means the device is un-commissioned in that it is not currently a member of any network, and that an FN flag is set in the scan requests it broadcasts in order to indicate this fact (note: a device can be in the Factory New state when indeed fresh from the factory or "out of the box", but can also can be reset to this state). Definitions are given in ZigBee Document 11-0037-10, Apr. 5, 2012 (e.g. see section 3).

Referring to FIG. 1, a ZLL network is formed from a Factory-New (FN) initiator node 2 and a Router node 4a (usually the initiator is an End Device). In the Hue system for example, the bridge is the initiator 2 and the light bulb is the router 4a. N.B. in the case of an LED bulb, this is not strictly a bulb in the sense of a filament bulb, but rather the term "bulb" is used herein as a shorthand for a modular lighting element (i.e. a lamp) that can be fitted into a luminaire. For example this may be a retrofittable replacement for conventional filament bulb, e.g. with the same screw or bayonet fitting.

The user can invoke the Touchlink network creation operation by selecting a "discover new device" option through the smartphone app (or such like) connected to the bridge 2. As illustrated in FIG. 1, the Touchlink operation comprises the following steps.

At step 100, the initiator (in thus example the Hue bridge) 2 broadcasts a Scan Request to light bulbs in its vicinity. The range of the vicinity is application specific.

At step 110, any receiving bulb 4 replies to the Scan Request by sending a Scan Response (FIG. 1 shows one bulb 4a only by way of illustration). According to ZLL, a device (in this case a bulb) shall only respond to a received Scan Request if the RSSI (Received Signal Strength Indication) with which it received the Scan Request is above a certain application-specific threshold. Typically, ZLL requires putting the initiator 2 and the router 4a physically close to each other. Since it is practically not feasible or convenient to put the Hue bridge 2 and blubs 4 very close, the Hue system allows a larger distance between the bridge 2 and bulbs 4 by setting a lower RSSI threshold. A bulb 4 staying outside the vicinity range set by the RSSI threshold won't respond to the request and therefore can't be discovered by the initiator 2. In that case, the user needs to temporarily move the bulb 4 into the vicinity range to complete the Touchlink operation and then move it back to its installation location.

If the initiator 2 receives a Scan Response from multiple bulbs 4, the application will choose one bulb 4a for subsequent processing. Typically, the one with the highest RSSI is chosen. In the Hue system, the user chooses a bulb in the smartphone app. At step 120, the initiator 2 may get more information on the bulb 4a of interest by sending a Device Information Request before making the selection (specifically, information on what sub-devices are supported, wherein a given device such as bulb 4a may be divided into sub-devices when it has more application endpoints, for example two independent light outputs e.g. see section 7.1.2.3.2 of ZigBee Document 11-0037-10). In response to this, at step 140 the bulb 4a replies with the information in a Device Information Response message. At step 140, the initiator 2 may send an Identify Request to the bulb 4a which has been chosen as the first Router of the new network, in order to confirm that the correct physical node is being commissioned. At step 150, the initiator sends a Network Start Request to the chosen Router (bulb) 4a in order to create and start the network.

At step 160, the Router 4a creates and starts a new network, and then replies to the Network Start Request by sending a Network Start Response. If the Router is not Factory-New, it should leave its old network before creating the new network.

The initiator 2 then joins the network.

Once the network (consisting of the initiator 2 and one Router 4a) is up and running, additional bulbs 4 can be added by conducting a network-extending type Touchlink operation.

FIG. 2 illustrates the process of adding a node 4b to an existing ZLL network. The bridge 2 can add additional bulbs 4 when being requested to do so by the user (e.g. by another selection of the "discover new device" option). As shown in FIG. 2, the steps involved in this variant of the Touchlink operation are similar to the network creation scenario, with steps 200 to 240 being the same as steps 100 to 140 respectively (i.e. up to and including the Identify Request). However, instead of sending a Network Start Request to the chosen bulb 4a, at step 250 the bridge 2 sends a Network Join Request to the chosen bulb 4b, and at step 260 the bulb 4b then joins the network by responding to the bridge 2 with a Network Join Response (leaving its old network first if necessary). Not only a Router, but also an End Device can be added to an existing network using this operation.

WO 2015/078778 A1 describes commissioning in Zigbee Light Link (ZLL) networks. The proposed solution takes advantage of the existing Touchlink procedure in order to enable a controller device joining a ZLL network without having to Touchlink with every single lighting devices comprised in the ZLL network.

US 2010/150063 A1 describes a method for a new node to join an ad-hoc network. The method includes two basic functions. When the new node is allowed to join the network, the indicating device of the node being joined generates an indication. When the new node joins the network, the indicating device of the new node also generates an indication

SUMMARY

The current Touchlink-based commissioning process can also be used for ZLL sensors, to add a sensor such as a presence sensor into an existing ZLL network to accompany the one or more bulbs of a given luminaire. However, this requires lots of user involvement.

For example, currently the user has to initiate the adding of the sensor via the bridge 2, from the app on their smartphone or tablet, in the same way they do for new bulbs. However, it is identified herein that this is still more user involvement than it necessarily has to. Further, while a bulb can flash or blink to indicate visually to the user that the bulb selected on screen in the app is indeed the bulb being added to the network, a sensor typically does not have such visible means (or at least not such prominently visible means). This makes the commissioning of sensors more awkward for the user than for bulbs.

It would be desirable to provide a "plug-and-play" ZLL sensor with automatic commissioning function that is more user-friendly. Particularly, it would be desirable if a user could install a sensor in or alongside a given luminaire to accompany the bulb or bulbs of that luminaire, but initiate the adding of the sensor to the existing network from the sensor itself, such as by pressing a button on the exterior of the sensor unit, rather than using the smartphone app.

However, this aim is not straightforward, because according to the ZigBee standard, a Factory New initiator will always start its own new network. This makes it impossible to initiate the adding of a sensor from the sensor solely based on the conventional Touchlink process. I.e. if the user initiated the linking from the sensor rather than via the bridge in the conventional manner, then without any adaptation of the Touchlink process, this would cause a new network to be started between the sensor and lamp, instead of joining the sensor to the existing network of which the bulb and bridge are already members.

One could in principle design a new proprietary protocol or request a change to the existing standard, but that is not very practical.

Instead therefore, the present disclosure provides a method of manipulating the process within the rules of the existing ZLL standard; i.e. using the existing message types of the standard, but finding an exchange of such messages that goes beyond what is prescribed by the standard while still not breaking the rules of the standard. By reusing the Touchlink messages of the ZLL standard in such a way, the commissioning process can be made user-friendly with least user involvement. After being installed beside its target device (e.g. a lighting device), the sensor automatically joins the ZLL network on which the target device operations and binds with the target device after the user triggering the commissioning.

More generally, it may be desirable to enable any type of new (as-yet un-commissioned) initiator node to join an existing network of a second, other node, whether the initiator and second nodes are sensor and lighting device or other types of node, and whether the network is a ZigBee Light Link (ZLL) network, another type of ZigBee network or even a protocol other than ZigBee having similar rules regarding initiators and joining. That is, the principle of the invention can be applied in relation to any standardized wireless networking protocol whereby according to said protocol it is defined that, when an initiator node is a new node not already joined to a wireless network of said protocol, and when the initiator nodes initiates a linking operation comprising a standardized exchange of messages between the initiator node and a second node, then the linking operation will create a new wireless network of the initiator node which the second node joins.

According to one aspect disclosed herein, there is provided a method of adapting use of such a protocol. Instead of using a complete instance of said linking operation (comprising the full standardized exchange of messages), the method instead comprises: adapting a field of one of said messages to form an adapted message, and sending the adapted message from the initiator node to the second node, in order to indicate that the adapted message is in fact a request for the initiator node to join an existing wireless network of said protocol, to which the second node is already joined, wherein said field is a field which the standardized protocol allows to be varied for application specific purposes. In response to the adapted message, the initiator receives back an invitation message inviting the initiator node to join the existing network; and in response to the invitation message, the initiator joins the existing network. E.g. the adapted message may be a Device Information Request of a ZigBee protocol.

Thus, the method involves exploiting a field of one of the messages that is legitimately within the system designer's domain to set, using this to embed a new signal to the second node. This signal causes the second node to break out of the current linking operation initiated by the initiator node, and instead begin another instance of the standardized linking operation initiated by another, existing node of the network.

Note that in embodiments, the invitation message is received back by the initiator node from a third node, the request having been forwarded to the third node from the second node. Preferably, in response to the adapted message being received by the second node, the initiator node receives back a response message from the second node confirming receipt of the adapted message; and in response to the response message, the initiator node stops the standardized linking operation and instead waits for the receipt of the invitation message from the third node. E.g. said response message may be a Device Information Response of the ZigBee protocol.

The exploited field does not have to be a field that is completely free for application-specific use. Rather, it could have a nominal prescribed use but the value is nonetheless settable in dependence on application. For instance, said field may be defined as having a particular purpose in the standard in question; and said indication, that the adapted message a request for the initiator node to join the existing wireless network, may be indicated by including a value in said field outside of a range recognized by the second node for said purpose. A particular example in the case where the field is the Start Index Field of the Device Information Request command, is that a value is set that is beyond the available number of sub-devices of the second node.

In embodiments, the initiator node may take the form of a sensor device, such as a presence sensor or an ambient light sensor. A presence sensor (sometimes also called an occupancy sensor) is a device for sensing the presence of a person in a certain space, based a detected property such as movement or heat. E.g. for detecting movement of a person, the presence sensor may comprise an active ultrasound sensor; or for detecting the heat generated by a person, the sensor may comprise a passive infrared sensor.

Once commissioned, the sensor may be configured to control or at least influence the control of the luminaire or lamp(s) with which the sensor is now joined into the network. E.g. the illumination may be turned on or dimmed up in response to sensing presence of a person, or turned off or dimmed down in response to sensing the absence of a person; or the illumination may be turned on or dimmed up in response to sensing an decrease in ambient light (e.g. daylight); or turned off or dimmed down in response to sensing an increase in the ambient light.

In embodiments, the second node may take the form of a lighting device for illuminating an environment. This could either be a luminaire, or an individual lamp for inserting into a luminaire. E.g. the lamp could be a retrofittable replacement for a filament bulb.

In embodiments the third node may take the form of a lighting control bridge. E.g. the lighting control bridge may provide an interface between the wireless network and a remote control device, such as a user terminal running a lighting control application, thereby enabling the user to control the second node and/or initiator node using the remote control device.

In embodiments, the second node is a router of a mesh network, e.g. a Router according to a ZigBee network. Alternatively the second node may be only an end device of a mesh network, e.g. an End Device of a ZigBee network.

In embodiments, the method may further comprise grouping the initiator node and second node into a group of nodes being a subset of a total number of nodes in the existing network, and assigning a group address enabling the nodes of the group to be addressed as a group.

In embodiments, the initiator node may have no visual means of signalling to a user that it has been selected for commissioning.

In embodiments the initiator node is triggered to initiate the linking operation by a user actuating a manual control (e.g. a mechanical button) included on an exterior housing of the initiator device.

According to another aspect disclosed herein, there is provided a device configured to perform a method according to any of the embodiments disclosed above or elsewhere herein.

According to another aspect of the invention, there is provided a device comprising a controller adapted to operate in accordance with a standardized networking whereby according to said protocol it is defined that, when an initiator node is a new node not already joined to a wireless network of said protocol, and when the initiator node initiates a linking operation comprising a standardized exchange of messages between the initiator node and a second node, then the linking operation will create a new wireless network of the initiator node which the second node joins; wherein the method comprises, instead of using a complete instance of said linking operation:

wherein the device comprises a controller to determine whether the device is a new node is configured to not already joined to a wireless network of said protocol and being adapted to, upon determination that the device is a new node, instead of using a complete instance of said linking operation:

adapt a field of one of said messages to form an adapted message, the device further comprising a transmitter for transmitting the adapted message to the second node, in order to indicate that the adapted message is in fact a request for the device being an initiator node to join an existing wireless network of said protocol, to which the second node is already joined, wherein said field is a field which the standardized protocol allows to be varied for application specific purposes;

a receiver for receiving an invitation message inviting the initiator node to join the existing network in response to the adapted message; and in response to the invitation message, the device being the initiator node joining the existing network.

According to another aspect of the present disclosure, there is provided a system comprising the initiator node, second node and third node.

According to another aspect disclosed herein, there is provided a computer program product comprising code embodied on a computer-readable storage medium and configured so as when run on a processing apparatus to perform a method according to any of the embodiments disclosed above or elsewhere herein.

BRIEF DESCRIPTION OF THE DRAWINGS

To assist understanding of the present disclosure and to show how embodiments may be put into effect, reference is made by way of example to the accompanying drawings in which:

FIG. 3 is a block diagram showing a wireless network, and FIG. 4 is a signalling diagram showing a modified process for joining a new node to an existing network.

DETAILED DESCRIPTION OF EMBODIMENTS

Figure 1:
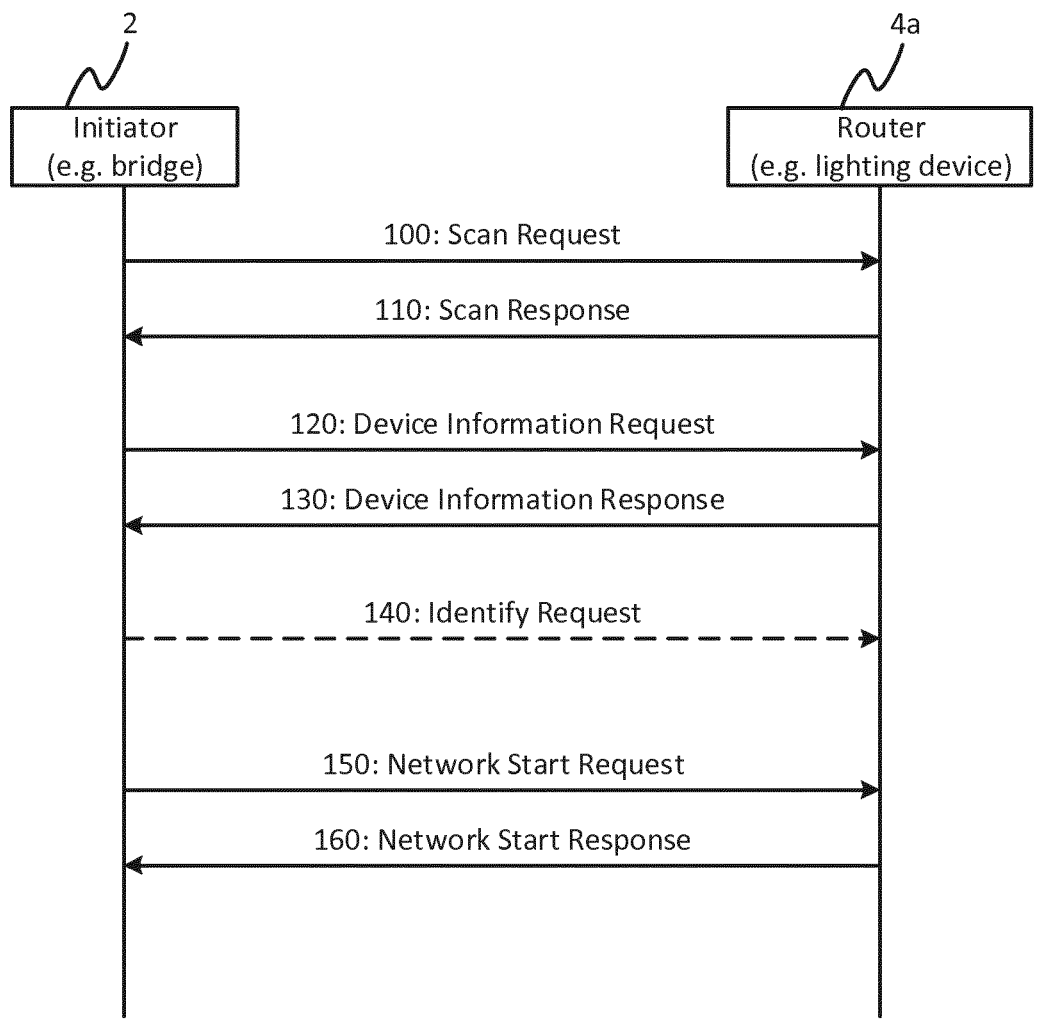
FIG. 1 is a signalling diagram showing a ZLL Touchlink operation for starting a new network.
Figure 2:
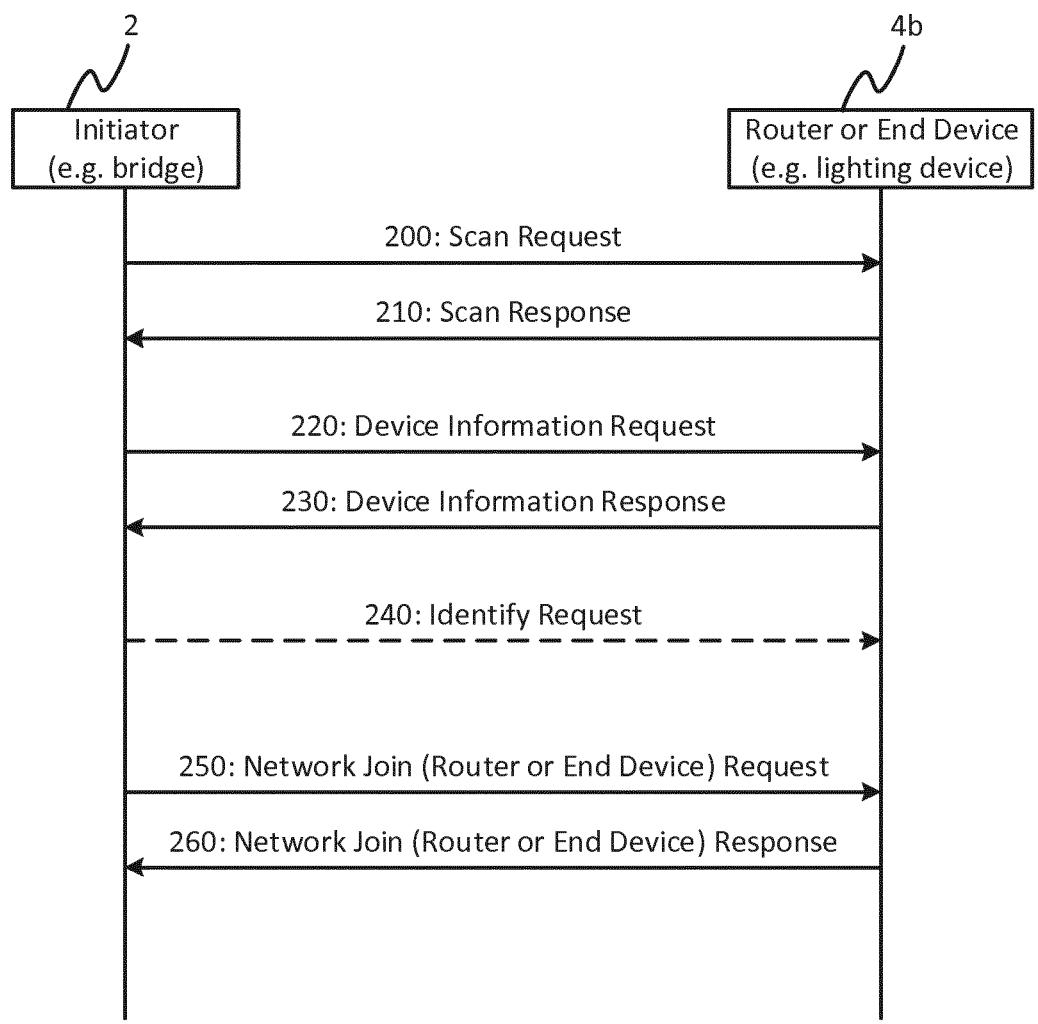
FIG. 2 is a signalling diagram showing a ZLL Touchlink operation for joining a new node to an existing network.

FIG. 3 illustrate a network setup of the scenario in accordance with embodiments of the present disclosure. The system comprises a lighting control bridge 2 and a plurality of lighting nodes 4 connected in a ZLL network 6. Each of the lighting nodes 4 is a lighting device in the form of a luminaire or an individual lamp, e.g. an LED-based "bulb" (a luminaire refers to the lighting unit comprising one or more lamps and any associated housing, socket or support; while a lamp refers to the lighting element within a luminaire, such as an LED-based lamp comprising a string or array of LEDs, or a fluorescent tube or filament bulb). In one preferred embodiment the lighting nodes each take the form of a retrofittable replacement for a traditional filament bulb or fluorescent tube.

The lighting control bridge 2 provides an interface between the ZLL network and a remote control device (not shown), enabling a user to control the illumination emitted by the lighting nodes 4. Preferably the remoted control device takes the form of a mobile user terminal such as a laptop, tablet, smartphone or smart watch, and the connection with the bridge thereby enables the user to control the lighting via a lighting control application ("app") running on the user terminal. Alternatively however the remote control device could be a dedicated remote control unit. The remote control device need not be connected to the same network, e.g. the remote control device connects to the bridge 2 via another wireless access technology such as Wi-Fi or Bluetooth. The bridge 2 takes lighting control commands received from the remote control device via this wireless access technology, and then forwards them to the relevant lighting node(s) 4 to which they are directed via the ZLL network.

Imagine now for instance that a user has bought a new ZLL-based sensor 8 such as an occupancy sensor or daylight sensor, and wants to use it to control a lighting node 4a such as an LED-based bulb, e.g. in the corridor. After installing the sensor beside the lighting node 4a and turning it on, the user needs to commission the sensor, i.e. to add the sensor to the existing ZLL network 6 in which the lighting node 4a operates, and bind the sensor 8 with the lighting node 4a in order to realize occupancy-based control.

Commissioning of the sensor 8 includes two main phases. The first is to add the sensor 8 to the ZLL network 6. To do this the user selects a "discover new device" option on the smartphone app. Conventionally, in response to this the bridge 2 starts a network-extending Touchlink operation. Similarly, if the sensor's installation location is outside the vicinity range of the bridge 2, the user need to move the sensor 8 closer to the bridge to complete the Touchlink operation. If multiple new sensors are inside the vicinity range, the user has to choose the correct one to add to the network. Unlike a lighting node 4 which can identify itself by showing a specific lighting effect (e.g., flashing), sensors usually lack means for self identification. This may bring additional difficulties.

The second phase is to bind (or "pair") the sensor 8 with the lighting node 4a. The user selects a "create a new group" option on the smartphone app and adds the sensor and light point 4a into the new group, under a group ID (e.g. a ZigBee group address).

A more user friendly way with less user involvement would be for the commissioning to be initiated at the sensor 8 (e.g., triggered by the user by pushing a button on the sensor) and then the sensor automatically joins the ZLL network 6 and pairs with the lighting node 4a. However, according to the current Touchlink process as illustrated in FIG. 1, when a factory-new end device (i.e. in this case the sensor) Touchlinks with a router (in this case lighting node 4a) this will form a new ZLL network containing the sensor 8 and lighting node 4a—not join the sensor 8 to the existing network 6 as desired herein.

To address this, the following provides a plug-and-play ZLL sensor 8 with automatic commissioning function, which is realized by reusing the Touchlink operations of the ZLL standard. After being installed beside its target device (e.g. a lighting node 4a to which the sensor 8 sends a message), the sensor 8 automatically joins the ZLL network 6 in which the target device 4a is already operating, and binds with the target device after 4a the user triggering the commissioning.

Still referring to the setup in FIG. 3 as the example, i.e. where the lighting node 4a is the target device of the sensor, the main steps of the automatic commissioning process are:
  (i) The sensor 8 initiates a "special" Touchlink operation with the lighting node 4a, indicating via a parameter setting in one of the Touchlink commands that a Factory-New device is in fact requesting to joining the existing ZLL network 6 in which the lighting node 4a is currently operating;
  (ii) The lighting node 4a responds to the request within the same Touchlink operation, asking the sensor 8 to stop the Touchlink operation and wait for a Network Join Request from the bridge 2 (information on the bridge 2 is provided in the response command as well);
  (iii) The sensor 8 stops the Touchlink operation and waits for request from the bridge, and the lighting node 4a forwards the request to the bridge 2;
  (iv) The bridge 2 sends a Network Join Request to the sensor 8 via another Touchlink operation with the sensor 8 (this time initiated from the bridge 2 rather than the sensor 8);
  (v) The sensor 8 validates the request first, and then accepts the request to join the ZLL network 6;
  (vi) The bridge 2 creates a new group having a group ID (e.g. ZigBee group address), and then adds the sensor 8 and lighting node 4a into the group under this group ID. Alternatively if the lighting node 4a is already a member of a group (e.g. lighting node 4a is an individual lamp and the group is the lamps in this same luminaire), then in some embodiments the bridge 2 may add the sensor to this existing group.

The group is a subset of the total nodes in the network 6. The group ID allows the sensor 2 and lighting node 4a to be identified or addressed as a group within the network 6, e.g. to control them as a group via the network 6, or present them as a group in a user interface of the lighting control app running on the user device (not shown). This grouping may also be referred to as "binding" or "pairing" elsewhere herein (though note it is not excluded there could also be other nodes included in the group, e.g. all the FIG. 4 shows the message flow of the automatic sensor commissioning process according to one embodiment of the invention.

The first "special" Touchlink operation contains the following commands.

At step 400, the sensor broadcasts a Scan Request command to any ZLL devices in its vicinity. The content of this command frame is the same as a normal Scan Request command. The sensor 8 indicates to the target device that it is a Factory-New ZigBee End Device by setting the following fields.

Transaction identifier field: a 32-bit non-zero random number which is used to identify the current transaction (i.e. the Touchlink operation). This parameter will be forwarded to the bridge 2.

ZigBee device information field: set the logical type subfield to indicate that the initiator 8 is a ZigBee End Device.

ZLL information field: set the Factory New subfield to indicate that the initiator is factory-new.

At step 410, the lighting node 4a sends a Scan Response command back to the sensor 8. The content of this command frame is the same as a normal Scan Request command. It is possible that more than one device sends this command to the sensor 8, but the command sent from lighting node 4a is the one having the highest RSSI among all the commands received by the sensor 8. The sensor 8 records the following fields of the command sent from the lighting node 4a for later use.

PAN identifier field: specifies the PAN (i.e. ZLL network 6) on which lighting node 4a operates.

Logical channel field: specifies the ZLL channel on which lighting node 4a is operating.

Number of sub-devices field (optional): specifies the number of sub-devices (endpoints) supported by the device 4a. According to the standard, one device can support up to 240 endpoints.

In ZigBee terminology, an end device (or router) is a device with ZigBee module. Sub-devices are functional modules within an end device. For example, a ZigBee end device can contain multiple sensor modules: occupancy, daylight, temperature, etc. Endpoint (distinct from End Device) is another term for sub device.

At step 420, in response to the Scan Response, the sensor 8 sends a Device Information Request command to the lighting node 4a, i.e. the device from which the received Scan Response has the highest RSSI. The start index field of the command frame is used to indicate that this is a "special" Touchlink operation.

Start index field: conventionally, according to the ZLL standard, this specifies the starting index (starting from 0) into the device 4a (sub device or endpoint) table from which to get device information. For a given receiving node, the valid value range of this field is from 0 to ("number of sub-devices"−1), where "number of sub-devices" is the number of sub-device of the receiving node (in this example the lighting node 4a).

If the start index field was being used for it normal purpose, then the sensor 8 would be requesting the lighting node 4a to report back information stored at some start index X in the table stored at the lighting node 4a.

However, according to embodiments of the present disclosure however, by setting a value which is beyond the "normal" range of the field, e.g., 0xff or "number of sub-devices", the sensor 8 and lighting node 4a can realize the "special" Touchlink operation. I.e. by including a number outside the available range of this (non-essential) field, the sensor 8 re-uses this field for another purpose, to signal to the lighting node 4a that the sensor 8 in fact wishes to join the existing ZLL network 6 of the lighting node 4a. Note: the number is still within the valid range (i.e. 0-255) from the perspective of the ZigBee standard specification, but it is out of range from the perspective of the particular receiving node (in this example the lighting node 4a). For example, the bulb 4a contains five sub-devices, while the sensor is asking the information of the sixth sub-device, or the $256^{th}$ sub-device (index 255, =0xff in hexadecimal).

At step 430, in response to the Device Information Request, the lighting node 4a sends a Device Information Response command to the sensor 8. Knowing based on the modified Device Information Request that a Factory-New ZigBee device is asking to join the ZLL network 6 in which it is operating, lighting node 4a sets the IEEE address subfield of the Device Information record field of the command frame as the IEEE address of the bridge 2. On receiving the Device Information Response, the sensor 8 checks whether the value of the IEEE address subfield is same as the IEEE address of the sender (i.e. lighting node 4a). If different, the sensor knows that the lighting node 4a has accepted its request. Then, at step 440, the sensor 8 stops the current Touchlink operation and waits on the channel specified by the Logical Channel field for a Network Join (End Device Request) command from a device of which the IEEE address is specified by the IEEE address subfield.

After the stop of the "special" Touchlink operation, the commission process continues with the following operations. At step 450, the lighting node 4a forwards the request of the sensor 8 to the bridge 2 by sending a normal ZigBee message to the bridge 2, including the following information.

The Transaction identifier of the special Touchlink operation;

The IEEE address of the sensor 8; and

The Logical type of the sensor 8, i.e. End Device.

In response to this, at step 460 the bridge 2 starts a new Touchlink network-extending operation by sending a Network Join (End Device) Request directly to the device of which the IEEE address is specified in the forward request message (i.e. the sensor 8). Since the device type is End Device, a Network Join (End Device) Request is used. The value of the Transaction identifier field of the command frame is set as the transaction identifier of the special Touchlink operation.

At step 470, the sensor validates the Network Join (End Device) Request: on receiving the network join request, the sensor 8 validates the transaction identifier field, the PAN identifier field and the IEEE address of the sender 2 by comparing them with the recorded values.

At step 480, in response to the Network Join (End Device) Request, the sensor 8 joins the network 6 and sends a Network Join (End Device) Response back to the bridge 2. The content of the command frame is same as a normal one.

Finally, at step 490, the bridge 2 adds the sensor 8 to the same group as the lighting node 4. The sensor 8 sends a respective instance of the Add Group command to the lighting node 4a (step 480) and the sensor 8 (step 490), to add both of them into the same group.

From the user interaction point of view, to bring a sensor 8 close to its target device 4a for commissioning is very user friendly. In most applications, a sensor 8 is installed besides its target device 4a. In case a sensor 8 is installed apart from its target device 4a, commissioning the sensor 8 beside its target device is not only practical (a wireless sensor is usually battery powered) but also intuitive to the user.

It will be appreciated that the above embodiments have been described by way of example only.

For instance, the concept behind the invention is not limited to ZLL or even ZigBee, and more generally can be applied in relation to any standardized wireless networking protocol wherein the protocol prescribes that, when a new node (that is not already joined to a network) initiates a linking operation for joining that node with another node in a network, then a new network is to be created for this purpose rather than the initiator joining an existing network of the other node. A standardized protocol may be considered as any that is open for use by more than one independent organization, and is prescribed by a corresponding standards body. An initiator node is the first to contact the other for the purpose Further, the indication that the initiator 8 in fact wishes to join an existing network is not limited to being signalled in the Device Information Request, and more generally can be included in any free or non-essential field of any other message involved in the linking operation of the standardized protocol, e.g. in the Scan Request (or a scan request).

The field used may be a completely free field left open for the designer to use for whatever application-specific purpose they wish. Alternatively the field used may be a field having a defined purpose according to the standard (like the Start Index Field) but nonetheless where the system designer has some freedom to vary its value depending on the application. E.g. in the latter case, the indication could be sent by including an invalid value (outside the range supported by the second node) in the field in question—as in the embodiment of including a value outside the meaningful range of sub devices in the Start Index field, i.e. outside the number actually available at the receiving node 4a.

Furthermore, the disclosed techniques can be used in relation to other types of device, i.e. the initiator 8 could be a device other than a sensor, the second device 4a (router or end-point) could be a device other than a light source 4a, and the third device 2 could be a device other than a lighting control bridge. For instance, each of the initiator node 8, second node 4a or third node 2 could be any of: a lamp, a luminaire, a lighting control bridge, a presence sensor, an ambient light sensor, a security camera, a battery pack, a smoke detector, a carbon-monoxide (CO) detector, an air conditioning unit, a heating unit, a wireless wall panel or wall switch, or a building controller; and the initiator node 8, second node 4a and third node 2 could be any combination of these and/or others). For instance the initiator node 8 could be smoke detector, CO detector, security camera, air con unit, heating unit, wall panel or wall switch being added into a building control network; with the second node 4a being another such device, and the third node 2 being a controller of a wireless building control network.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of adapting a standardized wireless networking ZigBee protocol, whereby according to said protocol it is defined that, an initiator node is a new node not already joined to a wireless network of said protocol, and a linking operation comprising a standardized exchange of messages between the initiator node and a second node, and wherein the protocol defines creating a new wireless network of the initiator node and the second node;

wherein the method comprises, instead of using the standardized exchange of messages of said linking operation as defined in the ZigBee protocol:

adapting a field of one message of said standardized exchange of messages to form an adapted message, and sending the adapted message from the initiator node to the second node, in order to indicate that the adapted message is in fact a request for the initiator node to join an existing wireless network of said protocol, to which the second node is already joined, wherein said field is a field which the standardized protocol allows to be varied for application specific purposes;

in response to the adapted message, the initiator node receiving back an invitation message inviting the initiator node to join the existing network; and in response to the invitation message, the initiator node joining the existing network.

2. The method of claim 1, wherein the second node is a lighting device for illuminating an environment.

3. The method of claim 1, wherein the initiator node is a sensor device.

4. The method of claim 1, wherein the invitation message is received back by the initiator node from a third node, the request having been forwarded to the third node from the second node.

5. The method of claim 4, wherein:

in response to the adapted message being received by the second node, the initiator node receives back a response message from the second node confirming receipt of the adapted message; and in response to the response message, the initiator node stops the standardized linking operation and instead waits for the receipt of the invitation message.

6. The method of claim 4, wherein the third node is a lighting control bridge.

7. The method of claim 6, wherein said response message is a Device Information Response of the ZigBee protocol.

8. The method of claim 1, wherein said wireless networking protocol is the ZigBee Light Link, and said operation is a Touchlink operation.

9. The method of claim 1, wherein the adapted message is a Device Information Request of the ZigBee protocol.

10. The method of claim 9, wherein said field is a Start Index field of the ZigBee protocol, specifying a start index in a table of device information.

11. The method of claim 1, wherein said field has a purpose defined by the standardized protocol; and wherein said indication, that the adapted message a request for the initiator node to join the existing wireless network, is indicated by including a value in said field outside of a range recognized by the second node for said purpose.

12. A device comprising:

a controller adapted to operate in accordance with a standardized ZigBee networking protocol whereby according to said protocol it is defined that, an initiator node is a new node not already joined to a wireless network of said protocol, and a linking operation comprising a standardized exchange of messages between the initiator node and a second node, and wherein the protocol defines creating a new wireless network of the initiator node and the second node; wherein the device comprises, instead of using the standardized exchange of messages of said linking operation as defined in the ZigBee protocol:

determine whether the device is a new node is configured to not already joined to a wireless network of said protocol and being adapted to, upon determination that the device is a new node, instead of using the standardized exchange of messages of said linking operation, to create a new wireless network of the new node and the second node, adapt a field of one message of said standardized exchange of messages to form an adapted message, a transmitter for transmitting the adapted message to the second node, in order to indicate that the adapted message is in fact a request for the device being a new node to join an existing wireless network of said protocol, to which the second node is already joined, wherein said field is a field which the standardized protocol allows to be varied for application specific purposes;

a receiver for receiving an invitation message inviting the new node to join the existing network in response to the adapted message; and in response to the invitation message, the device being the new node joining the existing network.

13. A system comprising the device of claim 12 and further comprising the second node and the third node of the system being configured.

14. A non-transitory computer readable medium, including code when run on a processing apparatus to perform the steps of adapting a standardized wireless networking ZigBee protocol, whereby according to said protocol it is defined that, an initiator node is a new node not already joined to a wireless network of said protocol, and a linking operation comprising a standardized exchange of messages between the initiator node and a second node, and wherein the protocol defines creating a new wireless network of the initiator node and the second node; wherein the method comprises, instead of using the standardized exchange of messages of said linking operation as defined in the ZigBee protocol, code for:

adapting a field of one message of said standardized exchange of messages to form an adapted message, and sending the adapted message from the initiator node to the second node, in order to indicate that the adapted message is in fact a request for the initiator node to join an existing wireless network of said protocol, to which the second node is already joined, wherein said field is a field which the standardized protocol allows to be varied for application specific purposes;

in response to the adapted message, the initiator node receiving back an invitation message inviting the initiator node to join the existing network; and in response to the invitation message, the initiator node joining the existing network.

* * * * *